(12) United States Patent
Kominami et al.

(10) Patent No.: US 12,383,916 B2
(45) Date of Patent: Aug. 12, 2025

(54) INFORMATION MANAGEMENT METHOD, IDENTIFICATION INFORMATION IMPARTING APPARATUS, AND INFORMATION MANAGEMENT SYSTEM

(71) Applicant: TOYO SEIKAN CO., LTD., Tokyo (JP)

(72) Inventors: Atsushi Kominami, Kanagawa (JP); Soji Araki, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 493 days.

(21) Appl. No.: 17/603,794

(22) PCT Filed: Mar. 6, 2020

(86) PCT No.: PCT/JP2020/009691
§ 371 (c)(1),
(2) Date: Oct. 14, 2021

(87) PCT Pub. No.: WO2020/213290
PCT Pub. Date: Oct. 22, 2020

(65) Prior Publication Data
US 2022/0212214 A1    Jul. 7, 2022

(30) Foreign Application Priority Data

Apr. 15, 2019 (JP) .................................. 2019-077033

(51) Int. Cl.
*B05B 9/04* (2006.01)
*B05B 13/02* (2006.01)
(Continued)

(52) U.S. Cl.
CPC ............ *B05B 9/04* (2013.01); *B05B 13/0221* (2013.01); *B05B 15/00* (2013.01); *B05D 1/02* (2013.01);
(Continued)

(58) Field of Classification Search
None
See application file for complete search history.

(56) References Cited

U.S. PATENT DOCUMENTS

| | | | | |
|---|---|---|---|---|
| 4,820,912 A | * | 4/1989 | Samyn | D21H 21/48 340/5.86 |
| 5,601,931 A | * | 2/1997 | Hoshino | G06K 19/06196 360/2 |

(Continued)

FOREIGN PATENT DOCUMENTS

| | | |
|---|---|---|
| CN | 1947126 A | 4/2007 |
| CN | 108591675 A | 9/2018 |

(Continued)

OTHER PUBLICATIONS

Search Report in International Application No. PCT/JP2020/009691 dated Apr. 14, 2020, 6 pages.

(Continued)

*Primary Examiner* — Jethro M. Pence
(74) *Attorney, Agent, or Firm* — Marshall, Gerstein & Borun LLP

(57) ABSTRACT

Provided are an information management method, an identification information imparting apparatus, and an information management system that use a spray pattern capable of identifying a target object in a simple way. The present invention is characterized by: spraying a liquid material on a part of a target object (Oi) by the liquid material ejection device (10) to form an irregular spray pattern (Mi); storing a spray pattern image (Pi), which is obtained by photographing and imaging the spray pattern (Mi), and information (Ri) about the target object in association with each other; and managing the information about the target object using the spray pattern image (Pi) as identification information of the target object.

2 Claims, 12 Drawing Sheets

(51) Int. Cl.
  *B05B 15/00* (2018.01)
  *B05D 1/02* (2006.01)
  *B64C 39/02* (2023.01)
  *B64D 1/18* (2006.01)
  *H04N 7/18* (2006.01)
  *B64U 101/30* (2023.01)
  *B64U 101/45* (2023.01)

(52) U.S. Cl.
  CPC .............. *B64D 1/18* (2013.01); *H04N 7/18* (2013.01); *B64U 2101/30* (2023.01); *B64U 2101/45* (2023.01)

(56) References Cited

U.S. PATENT DOCUMENTS

| | | | |
|---|---|---|---|
| 7,324,697 B2 * | 1/2008 | Kazui | G06T 1/0035 |
| | | | 382/232 |
| 7,694,875 B2 * | 4/2010 | Mitamura | G06K 1/121 |
| | | | 235/375 |
| 8,757,909 B2 * | 6/2014 | Yasuzaki | B41J 3/60 |
| | | | 400/621 |
| 9,045,283 B2 * | 6/2015 | Matsunoshita | G06Q 30/0185 |
| 9,433,837 B2 * | 9/2016 | Sawatari | G06Q 10/06 |
| 9,849,693 B1 | 12/2017 | Liu et al. | |
| 10,104,156 B2 * | 10/2018 | Ito | H04L 67/10 |
| 11,533,436 B2 * | 12/2022 | Kouno | G08B 13/19608 |
| 11,676,286 B2 * | 6/2023 | Iizuka | G06V 40/28 |
| | | | 382/103 |
| 2005/0239207 A1 | 10/2005 | Gelbart | |
| 2010/0027851 A1 | 2/2010 | Walther et al. | |
| 2015/0230751 A1 * | 8/2015 | Yamanaka | A61B 5/742 |
| | | | 600/586 |
| 2023/0162503 A1 * | 5/2023 | Watanabe | H04N 23/65 |
| | | | 348/143 |

FOREIGN PATENT DOCUMENTS

| | | |
|---|---|---|
| CN | 109448151 A | 3/2019 |
| JP | 2007-534067 A | 11/2007 |
| JP | 2010/507847 A | 3/2010 |
| JP | 2011-106815 A | 6/2011 |
| JP | 2013-69188 A | 4/2013 |
| JP | 2015-218531 A | 12/2015 |
| JP | 2017-108656 A | 6/2017 |
| JP | 2017-124691 A | 7/2017 |
| JP | 2018-034501 A | 3/2018 |

OTHER PUBLICATIONS

Office Action in CN Application No. 202080028815.4 dated May 27, 2022, 22 pages.

* cited by examiner

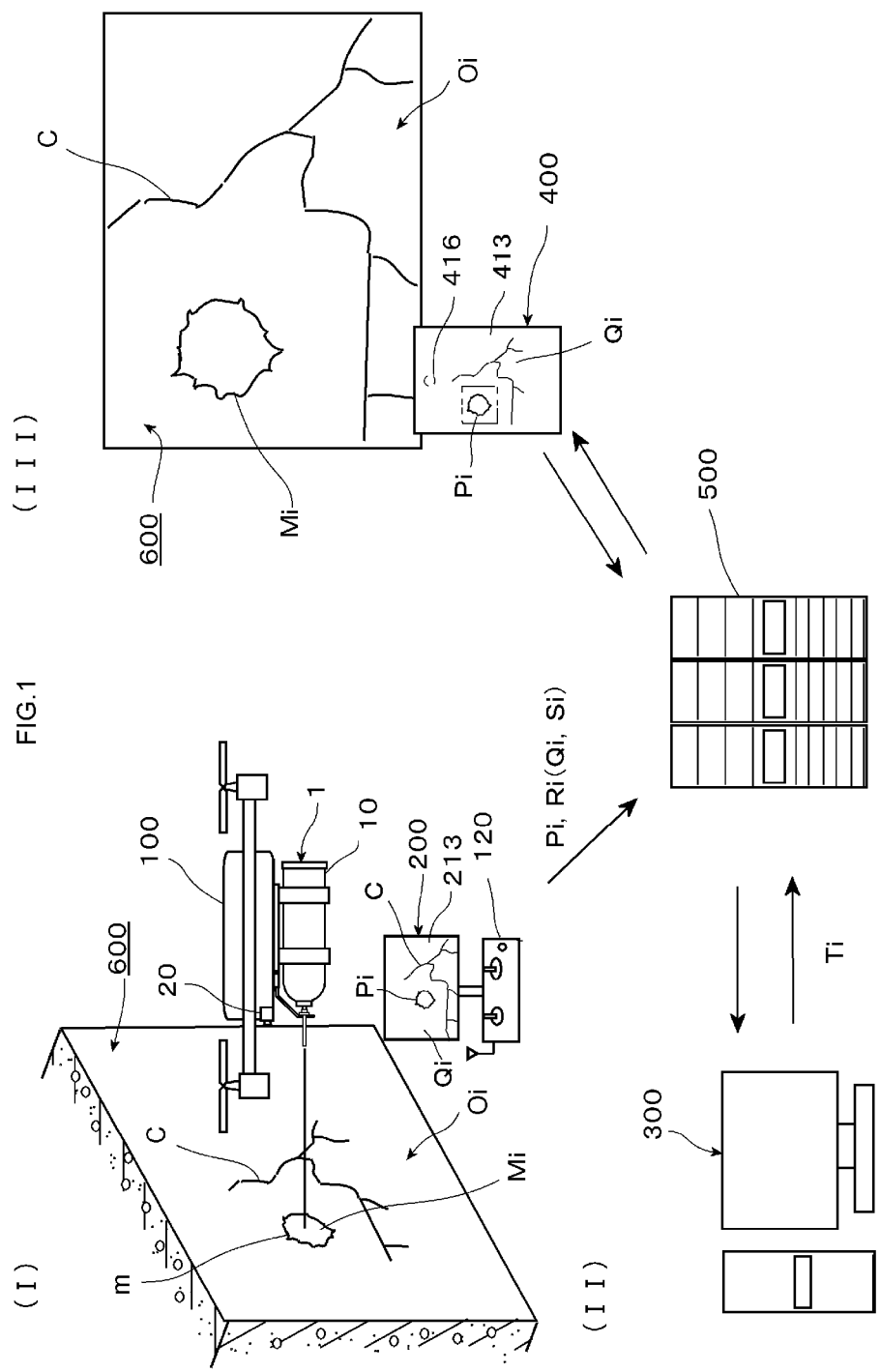

INFORMATION MANAGEMENT METHOD, IDENTIFICATION INFORMATION IMPARTING APPARATUS, AND INFORMATION MANAGEMENT SYSTEM

TECHNICAL FIELD

The present invention relates to an information management method, an identification information imparting apparatus, and an information management system in which a spray pattern formed by spraying paint on a target object is used as identification information of the target object.

BACKGROUND ART

In recent years, the use of unmanned flying objects (aerial vehicles) such as multicopters has been studied for the inspection of concrete walls of structures or the like such as tunnels, bridges, dams, buildings, etc. (for example, see Patent Literature 1).

However, even if an abnormality is found, the content of repair work is reviewed, and a construction plan for the repair work is made, it is difficult for a worker to identify an abnormal part from position information in the field. Thus, it is conceivable to add identification information such as characters, symbols, bar codes or the like.

CITATION LIST

Patent Literature

Patent Literature 1: Japanese Patent Application Laid-Open Publication No. 2017-124691

SUMMARY OF INVENTION

Technical Problem

However, it is difficult for a remotely operated machine, such as a multicopter, to write or digitally print existing characters and/or symbols on a structure as identification information. The reason is that, for example, with a multicopter, it is difficult to get close to a target object for printing or drawing that requires precision.

The inventors of the present invention have focused on the fact that spray patterns formed by spraying paint on target objects are not the same as one another and can identify the target objects like fingerprints, and have come up with an idea of using the spray patterns as identification information.

An object of the present invention is to provide an information management method, an identification information imparting apparatus, and an information management system that use a spray pattern capable of identifying a target object in a simple way.

Solution to Problem

In order to achieve the above object, an information management method of the present invention is characterized by: spraying a liquid material on a part of a target object to form an irregular spray pattern; storing a spray pattern image, which is obtained by photographing and imaging the spray pattern, and information about the target object in association with each other; and managing the information about the target object using the spray pattern image as identification information of the target object.

In addition, an identification information imparting apparatus of the present invention is an identification information imparting apparatus for imparting identification information to a target object, characterized by comprising:
a liquid material ejection means configured to spray a liquid material onto the target object to form an irregular spray pattern; and
an imaging means configured to image the spray pattern and record it as a spray pattern image; wherein the spray pattern image is used as identification information of the target object.

The present invention can also be configured as follows.
1. The liquid material ejection means is provided with an aerosol container for ejecting the liquid material by gas pressure in the container.
2. The liquid material ejection means is provided with a spray control means configured to control ejection of the liquid material from the aerosol container.
3. The liquid material is ejected as a jet stream.
4. The liquid material ejection means and the imaging means are mounted on a moving object.

Moreover, another information management method of the present invention is characterized by:
mounting an imaging means and a liquid material ejection means on a moving object;
moving the moving object to spray, upon finding a target region on a surface of a target object, a liquid material from the liquid material ejection means to a part of or a vicinity of the target region to form an irregular spray pattern;
imaging the target region including the spray pattern by the imaging means to obtain image information and to extract a spray pattern image from the image information;
obtaining position information of the moving object by a position information detection means; and
storing, in an information storage unit, the spray pattern image and target region information about the target region including the position information and image information of the target region in association with each other thereby to manage the information of the target region.

The present invention can also be configured as follows.
1. The target region of the target object is a region with an abnormality.

Further, an information management system of the present invention is an information management system for managing information about a target region of a target object, characterized by comprising:
a moving object on which an imaging means and a liquid material ejection means are mounted;
a spray pattern image obtaining means configured to execute processing of spraying a liquid material from the liquid material ejection means to the target object to form an irregular spray pattern, imaging the target region including the spray pattern by the imaging means to obtain image information, and extracting a spray pattern image from the image information;
a position information detection means configured to obtain position information of the moving object; and
a registration means configured to store, in an information storage unit, the spray pattern image and target region information about the target region including the position information and image information of the target region in association with each other.

1. Provision is further made for an information update means configured to update the target region information stored in the information storage means by adding an additional correction thereto.

2. Provision is further made for an information obtaining means configured to obtain the spray pattern image formed in the target region of the target object, and input the spray pattern image thus obtained thereby to obtain corresponding target region information from the information storage means.

3. The target region is a region of the target object in which there is an abnormal part, and provision is further made for an abnormality detection means configured to detect the abnormal part.

Advantageous Effects of Invention

According to the present invention, by using a spray pattern image of a liquid material as identification information, it is possible to manage information about a target object in a simple method of spraying the liquid material onto the target object. In particular, in cases where a moving object is used, even when it is difficult for the moving object to approach the target object, it is possible to easily impart identification information to the target object simply by spraying the liquid material thereto.

BRIEF DESCRIPTION OF THE DRAWINGS

FIG. 1 is a conceptual diagram illustrating an overall configuration of an information management system according to an embodiment of the present invention.

FIG. 3 illustrates an embodiment of an identification information imparting apparatus used in the information management system of FIG. 1, wherein

EMBODIMENTS FOR CARRYING OUT THE INVENTION

Figures 2A, 2B:
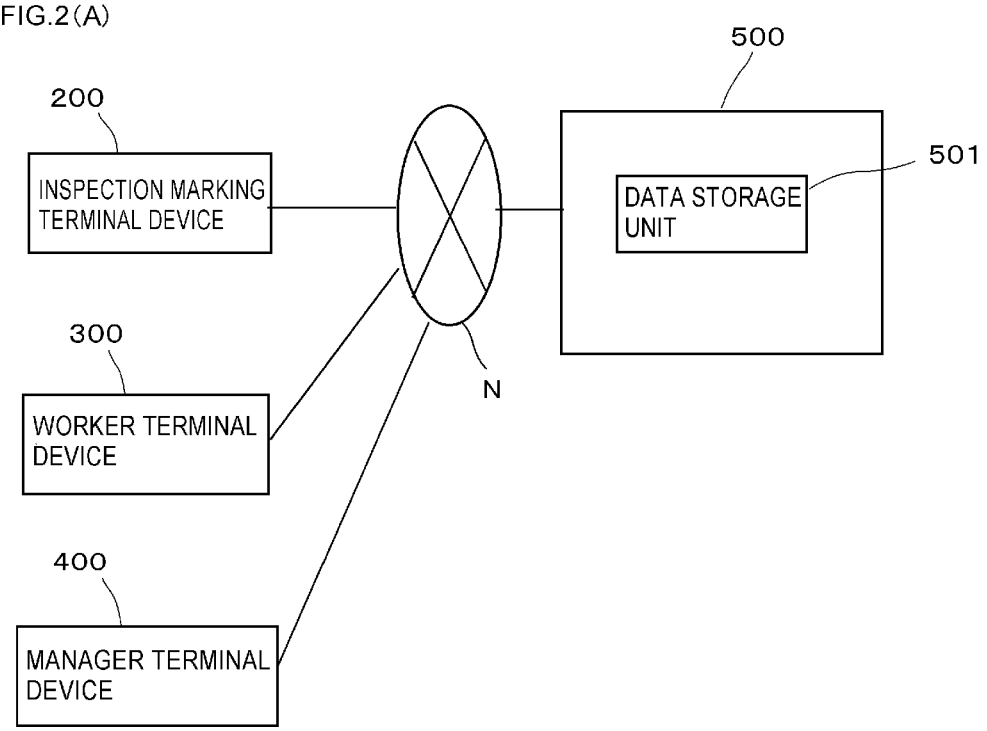
FIG. 2(A) is a block diagram of the information management system of FIG. 1.
FIG. 2(B) is an example of data stored in a data storage unit.

Hereinafter, the present invention will be described in detail on the basis of exemplary embodiments illustrated in the drawings. Dimensions, materials, and shapes of components, relative arrangements thereof, a hardware configuration of an apparatus, a software configuration, a processing flow, and the like described in the following embodiments are to be appropriately changed depending on a target object to which the present invention is applied, a configuration of the apparatus, and various conditions, and are not intended to limit the scope of the present invention to the following embodiments.

First, a conceptual configuration of an information management method and an information management system according to the present invention will be described by using FIG. 1. This embodiment will be described by taking, as an example, a case where a target object of the present invention is used for repair management of a concrete wall 600 of a structure such as a tunnel, a dam, an expressway, a bridge, a high-rise building or the like.

This information management is divided into three stages that include an inspection marking stage (I) for inspecting and marking an abnormal part of the concrete wall 600, a registration stage (II) of construction management data for registering a construction content of the abnormal part, and a repair work stage (III) for performing repair work. Hereinafter, each of the stages will be described.

Inspection Marking Stage (I)

In the inspection marking stage (I), a repair target region Oi is marked by spraying a liquid material using an identification information imparting apparatus 1.

The identification information imparting apparatus 1 includes a liquid material ejection device (liquid material ejection means) 10 and a camera 20 (imaging means), wherein the liquid material ejection device 10 serves to eject the liquid material to the repair target region Oi of the concrete wall 600 as the target object to form an irregular spray pattern. In this embodiment, the liquid material ejection device 10 and the camera 20 are mounted on a flying object 100 which is a moving object, and the concrete wall 600 is photographed and inspected by the camera 20 which is moving with the flying object 100, and the liquid material such as paint is ejected to a part of or a vicinity of the repair target region Oi, in which an abnormal part C has been found, to form a spray pattern Mi.

The liquid material ejected from the liquid material ejection device 10 collides with the concrete wall 600 and scatters in all directions to spread along a wall surface thereof, or splashes by gravity, air resistance or the like after being ejected and before reaching the wall surface to form the spray pattern Mi. Since the liquid material scatters radially and irregularly due to an impact or the like, an outer periphery m of the spray pattern Mi has an irregular uneven shape. The shape of the outer periphery is not constant, and none of them are the same, and hence, the repair target region Oi can be identified like a fingerprint.

The liquid material is a substance in the form of liquid, gel, cream, or paste, and for example, a paint or the like is used. As the liquid material, a material is suitable which does not fall off due to rain or the like and which can be removed as needed. In addition, a material may be used which is colorless and transparent in visible light and which can be identified by ultraviolet rays or infrared rays, or in the case of a concrete wall of a tunnel, a luminous material may be used so as to be easily seen or checked by a worker.

The flight of the flying object 100 is remotely controlled by a transmitter 120, and the liquid material ejection device 10 is controlled by an inspection marking terminal device 200 that constitutes a spray control means. In addition, the operation of the camera 20 is also controlled by the inspection marking terminal device 200.

The transmitter 120 controls the flight of the flying object 100, and basically controls the flight, including ascending, descending, turning, horizontal movement, by means of an operation device such as a lever. The exchange of signals between the flying object 100 and the transmitter 120 is communicated by wireless communication.

The inspection marking terminal device 200 controls the flying object 100, the liquid material ejection device 10, and the camera 20 via the transmitter 120, thereby to perform a series of processes of inspection, marking, and photographing. In the figure, there is illustrated a state in which a photographed image is displayed on a display unit 213 of the inspection marking terminal device 200.

That is, the flying object 100 is caused to fly along the concrete wall 600 while keeping a predetermined distance, so that the surface thereof is photographed by the camera 20 to detect the presence or absence of the abnormal part C such as a crack from an image thus photographed.

Subsequently, the repair target region Oi in which the abnormal part has been found is sprayed with the liquid material by the liquid material ejection device 10, so that it is marked with the spray pattern Mi.

Then, the repair target region Oi thus marked is photographed by the camera 20, and a spray pattern image Pi is extracted from the repair target region image Qi thus photographed and imaged, so that the spray pattern image Pi and repair target region information Ri related to the repair target region Oi including the repair target region image Qi are registered and managed in a management server 500 in association with each other. If the information of the repair target region image Qi and the information of the spray pattern image Pi are associated with each other, the photographing of the repair target region Oi may include the repair target region image Qi and the spray pattern image Pi in one image, or these pieces of information may be associated with each other in different images. Further, the repair target region Oi may be a set of a plurality of images. The repair target region information Ri includes, in addition to the repair target region image Qi, position information Si of the repair target region Oi and the like. The position information Si includes, for example, map information such as latitude, longitude, height, etc., the name of a structure provided with a concrete wall as a target object, and the like.

In the repair target region information Ri, the construction content including a repair work content for the abnormal part C is further registered, and the construction content is registered in the management data registration stage (II) which will be described below.

Registration Stage (II) of Construction Management Data

In the registration stage of the construction management data, a construction manager accesses the management server 500 from a manager terminal device 300, and determines and registers the construction content such as a repair method of the abnormal part such as a crack or the like, by referring to the repair target region image Qi.

Repair Work Stage (III)

In the repair work stage (III), the worker photographs the spray pattern Mi by means of a worker terminal device 400 at the site, transmits the spray pattern image Pi thus photographed to the management server 500, obtains the construction content of the corresponding repair target region Oi, and performs the repair work based on the construction content.

FIG. 2(A) illustrates a system configuration of the inspection marking terminal device 200, the manager terminal device 300, the worker terminal device 400, and the management server 500, which have been mentioned above.

The management server 500 includes a data storage unit (information storage unit) 501 in which the spray pattern image Pi and the repair target region information Ri related to the repair target region are stored in association with each other, and the inspection marking terminal device 200, the manager terminal device 300, and the worker terminal device 400 can communicate with one another via a communication network N such as the Internet or the like.

FIG. 2(B) illustrates an example of data stored in a data storage unit 501.

That is, the repair target region information Ri is stored in association with the spray pattern image Pi, and the repair target region image Qi including a repair target part, the position information Si, the construction content Ti and the like are included as the repair target region information Ri.

Next, the identification information imparting apparatus used in the inspection marking stage of FIG. 1 will be described in more detail.

Figure 3A:
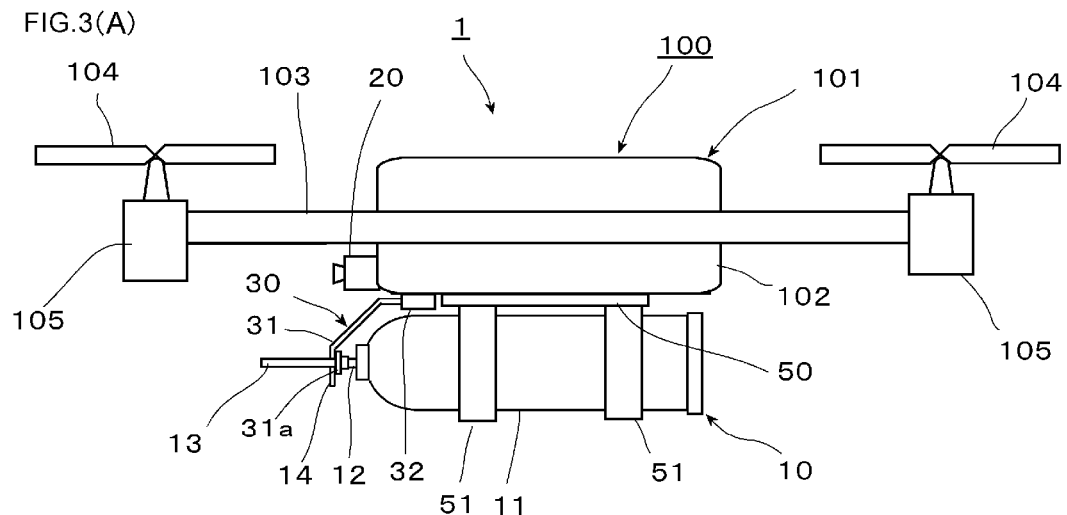
FIG. 3(A) is a front view.
Figure 3B:
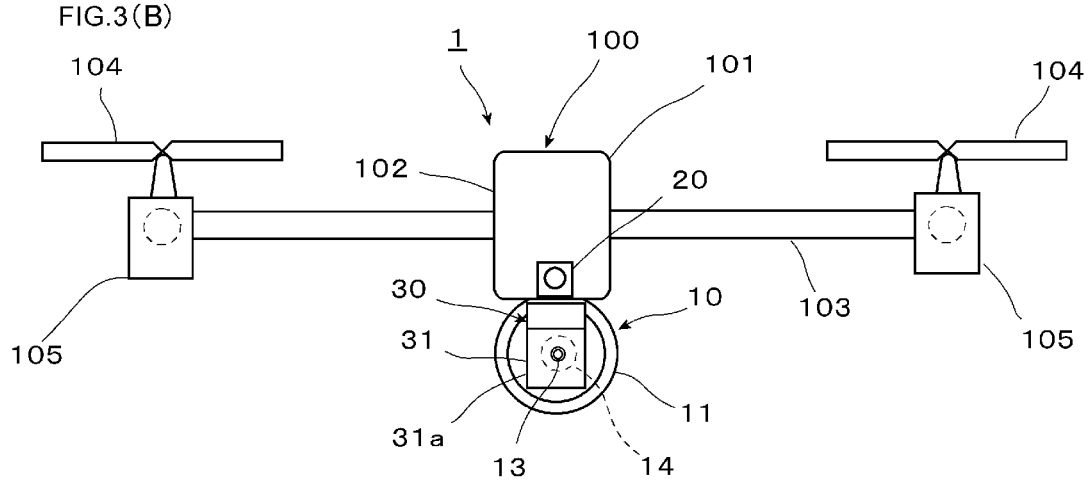
FIG. 3(B) is a side view.
Figure 3C:
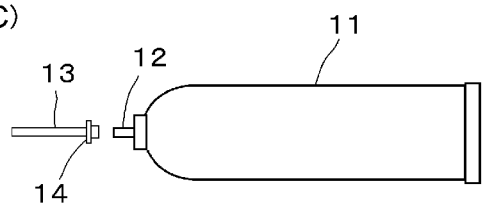
FIG. 3(C) is a view illustrating an aerosol container.

FIG. 3 illustrates the identification information imparting apparatus.

This identification information imparting apparatus 1 includes the flying object 100, and the liquid material ejection device 10 and the camera 20 mounted on the unmanned flying object.

Flying Object 100

In FIG. 3, the flying object 100 is a so-called multicopter, and has an airframe 101 that includes a main body portion 102 and a plurality of arm portions 103 extending radially from the main body portion 102, wherein rotor blades 104 are provided at distal ends of the arm portions 103 via motors 105, respectively. In the illustrated example, the rotor blades 104 are illustrated at two locations on the left and right, but in the sense that there are a plurality of rotor blades 104, various known multicopters, such as three (tricopter), four (quadcopter), six (hexacopter), etc., can be applied.

Liquid Material Ejection Device 10

The liquid material ejection device 10 is configured to include an aerosol container 11 that is mounted on the outside of the airframe 101 of the flying object 100, an actuator 13 with a nozzle that is connected to a stem 12 provided with a discharge passage of the aerosol container 11, and an opening and closing mechanism 30 that constitutes an ejection control unit adapted to push the stem 12 through the nozzle-equipped actuator 13 to open the discharge passage.

The aerosol container 11 is a container that ejects a liquid material as a content by the gas pressure of a liquefied gas or a compressed gas filled therein, and an existing aerosol container 11 made of metal or pressure-resistant plastic can be applied thereto. The aerosol container 11 generally sprays the liquid material in the form of a mist from the nozzle by attaching the actuator to the stem 12, but in the present invention, the purpose is to form a spray pattern, and the liquid material is ejected as a linear jet stream. Although the stem 12 alone can be used to eject the liquid material as a jet stream, it is necessary to push the stem 12 in, and hence in this embodiment, the actuator 13 with the flanged nozzle is connected thereto, and the stem 12 is pushed in by means of the opening and closing mechanism 30 through a flange 14 of the nozzle-equipped actuator 13, so that an unillustrated internal valve is opened to eject paint. Here, note that the nozzle is provided with an orifice, which allows a better jet stream to be ejected than in the case of only the stem.

In the illustrated example, the aerosol container 11 is mounted in a state where a central axis of the aerosol container 11 (a central axis of its body) is horizontally oriented by using a space on a lower surface of the airframe 101 of the flying object 100. A mounting device 50 is provided on the lower surface of the airframe 101, so that the aerosol container is mounted on the airframe 101 through the mounting device 50. The mounting device 50 shall be of a structure that can be attached to the airframe, and shall be firmly fixed by bolts or other screw fastening, band fastening, adhesive fastening, etc. The flying object 100 is detachably mounted on the mounting device 50 by a holding member 51 such as a clamper or the like.

The camera 20 is mounted on the front side of the airframe 101 so as to face forward with its photographing direction (optical axis direction of the lens) aligned with the direction of ejection by the aerosol container 11.

As the form of the propellant and the content of the aerosol container 11, an isolated type is used in which the liquid material is contained in an inner bag and the propellant is contained between the outer periphery of the inner bag and the inner periphery of the container body. In the case of the isolated type, ejection can be made from the aerosol container 11 even when the aerosol container 11 is in a horizontal orientation (the stem is positioned horizontally) or a downward orientation (the stem is positioned downward).

However, the present invention is not limited to the isolated type, and a two-phase type or three-phase type container with a dip tube can be applied when the posture of the aerosol container 11 at the time of liquid ejection is used with the stem 12 facing upward, and a two-phase type or three-phase type container having no dip tube can be applied when the posture of the aerosol container 11 is used with the stem 12 facing downward.

Here, note that liquefied gases such as general hydrocarbons (liquefied petroleum gas) (LPG), dimethyl ether (DME), and fluorinated hydrocarbons (HFO-1234ze), as well as compressed gases such as carbon dioxide ($CO_2$), nitrogen ($N_2$), and nitrous oxide ($N_2O$) can be used as propellants, but non-flammable fluorinated hydrocarbons, carbon dioxide, nitrogen, nitrous oxide, etc., are suitable, and nitrogen is particularly suitable, considering its environmental impact.

Opening and Closing Mechanism 30

The opening and closing mechanism 30 includes a pressing member 31 with an engaging portion 31a that engages with the flange 14 of the nozzle-equipped actuator 13, and a driving unit 32 which is a driving means, such as a solenoid, a linear motor or the like, that linearly drives the pressing member 31, wherein the pressing member 31 is driven in the axial direction of the aerosol container by means of the driving unit 32, whereby the stem 12 is driven in the direction of being pushed into the container via the pressing member 31 and the nozzle-equipped actuator 13. The drive unit 32 may be any mechanism that drives in a linear direction, and may linearly drive directly by a linear motor, a solenoid or the like, or may linearly drive via a motion conversion mechanism, such as a cam, a screw feed mechanism or the like, that converts the rotational motion of a rotary motor into a linear direction.

Other Mounting Examples of Liquid Material Ejection Device 10 and Camera 20

FIG. 4 illustrates an example in which the liquid material ejection device 10 and the camera 20 are mounted on the flying object 100 via a gimbal 40.

The gimbal 40 is a pedestal having degrees of freedom of rotation about three mutually orthogonal axes, and detects an inclination of each rotation axis by a sensor and corrects the inclination of the rotation axis by a motor, and various known devices can be applied to the gimbal 40. By using the gimbal 40, the camera 20 and the liquid material ejection device 10 can be stabilized, and the camera 20 and the liquid material ejection device 10 can be tilted.

Figure 4A:
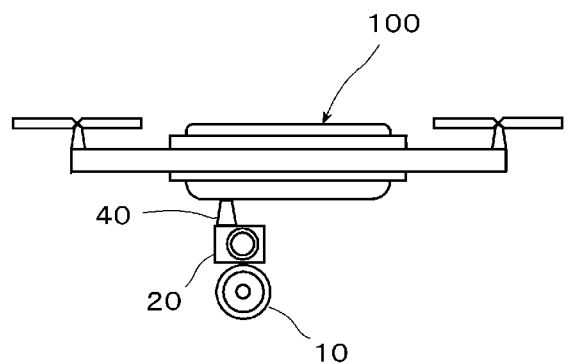
FIG. 4 is a diagram illustrating another configuration example of the identification information imparting apparatus.

FIG. 4(A) illustrates an example in which the liquid material ejection device 10 is attached to the camera 20 mounted via a gimbal 40. The liquid material ejection device 10 is held by utilizing a frame of the gimbal 40 that holds the camera 20. In this way, the camera 20 and the liquid material ejection device 10 are moved in synchronization with each other by means of the gimbal 40.

Figure 4B:
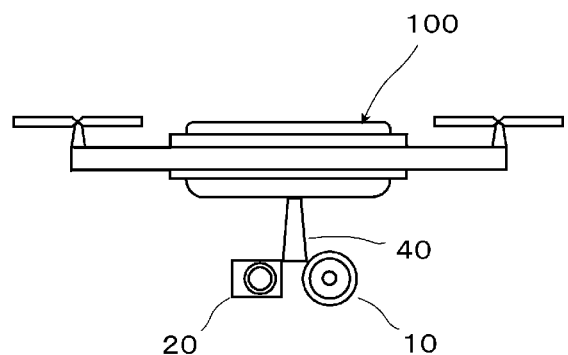

FIG. 4(B) illustrates an example in which the liquid material ejection device 10 and the camera 20 are attached to the gimbal 40 in a parallel state. In this case, too, the camera 20 and the liquid material ejection device 10 are moved in synchronization with each other by means of the gimbal 40.

Figure 4C:
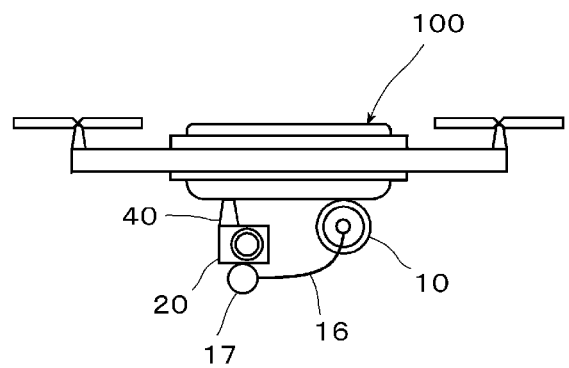

In FIG. 4(C), the liquid material ejection device 10 is mounted on the lower surface of the airframe 101 side by side with the camera 20 to balance the center of gravity, and a nozzle 17 is connected to an ejection port of the liquid material ejection device 10 via a flexible extension tube 16, so that the nozzle 17 is attached to the camera 20 held by the gimbal 40. In this case, the nozzle 17 is moved in synchronization with the camera 20 by means of the gimbal 40.

Control Unit of Flying Object

Figure 5A:
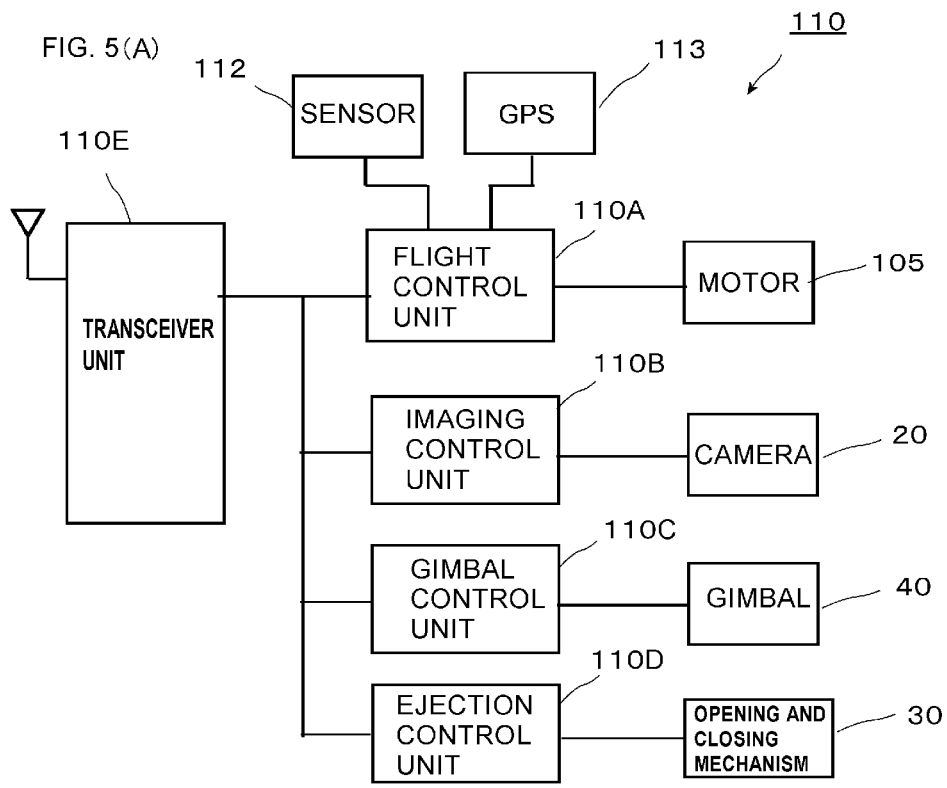
FIG. 5(A) is a control block diagram of a control unit of a flying object.

FIG. 5(A) is a control block diagram of a control unit provided in the flying object 100.

That is, the control unit 110 of the flying object includes a transceiver 110E that communicates with the transmitter 120, a flight control unit 110A that controls the flight of the flying object 100, a camera control unit 110B that controls the operation of the camera 20, a gimbal control unit 110C that controls the gimbal 40 in the case where the gimbal 40 is provided, and an ejection control unit 110D that controls the ejection timing and the ejection period of time of the opening and closing mechanism 30.

The flight control unit 110A calculates a control signal to the motor 105 of each of the rotor blades 104 based on detection information from sensors 112 such as gyro sensors, acceleration sensors, geomagnetic sensors, range sensors, etc., position information from a GPS 113, command signals from the transmitter 120, or command signals transmitted from inspection marking terminal device 200 via the transmitter 120, thereby to control the flight of the flying object 100. In the figure, only one motor 105 is described for simplification, but a plurality of motors are provided.

The camera control unit 110B executes a photographing or imaging operation by the camera 20 based on the command signals transmitted from the inspection marking terminal device 200 via the transmitter 120.

The ejection control unit 110D outputs ejection and stop signals to the driving unit 32 of the opening and closing mechanism 30 based on the command signals transmitted from the inspection marking terminal device 200 via the transmitter 120, thereby to control the ejection operation of the liquid material ejection device 10.

Each control unit is described as a functional block that executes a respective process, and although not particularly described, a computer can execute control processes of flight control, camera control, and ejection operation by performing arithmetic processing by a CPU which is a hardware resource provided in the control unit 110, on the basis of a program stored in a memory unit.

Figure 5B:
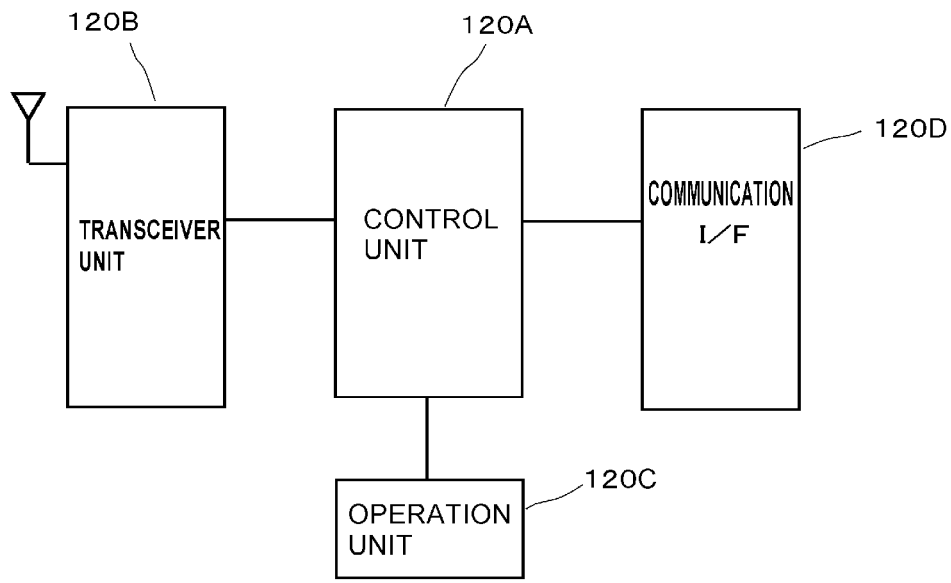
FIG. 5(B) is a control block diagram of a transmitter.

FIG. 5(B) is a control block diagram of the transmitter 120.

That is, it has a control unit 120A, a transceiver unit 120B that transmits signals to the transceiver unit 110E of the control unit 110 of the flying object via an antenna, an operation unit 120C such as a stick or the like, and a communication interface 120D (hereinafter, I/F) that communicates with the inspection marking terminal device 200.

Inspection Marking Terminal Device 200

Figure 6A:
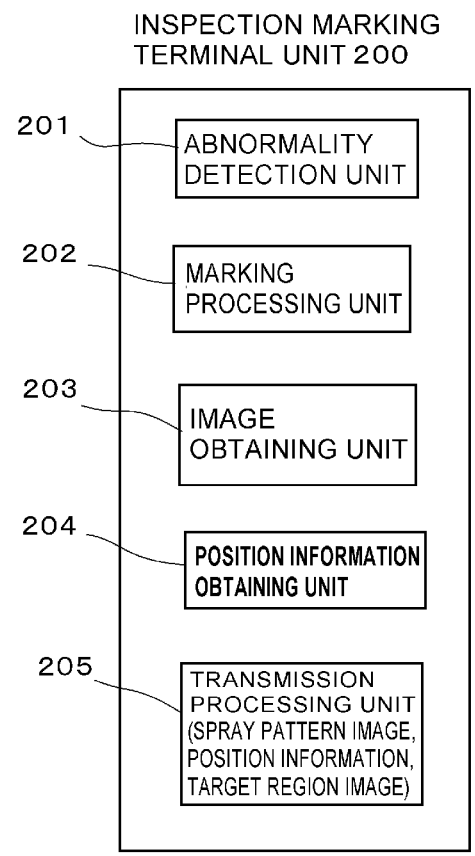
FIG. 6(A) is a functional block diagram of an inspection marking terminal device.

FIG. 6(A) is a functional block diagram of the inspection marking terminal device.

That is, it includes an abnormality detection unit (abnormality detection means) 201 for an inspection target region, a marking processing unit 202 that operates the liquid material ejection device 10 to perform marking processing, an image obtaining unit 203 that obtains an image of the target region marked, a position information obtaining unit (position information detection means) 204 that obtains position information, and a transmission processing unit 205 that transmits the spray pattern image, the position information, and the target region image to the management server 500 in association with each other.

In the image obtaining unit 203, the spray pattern image is extracted from the image of the target region.

The position information obtaining unit 204 obtains information about the location of the concrete wall 600 and position information about a spraying position.

This inspection marking terminal device 200 constitutes a spray pattern image obtaining means of the information management system of the present invention.

Figure 6B:
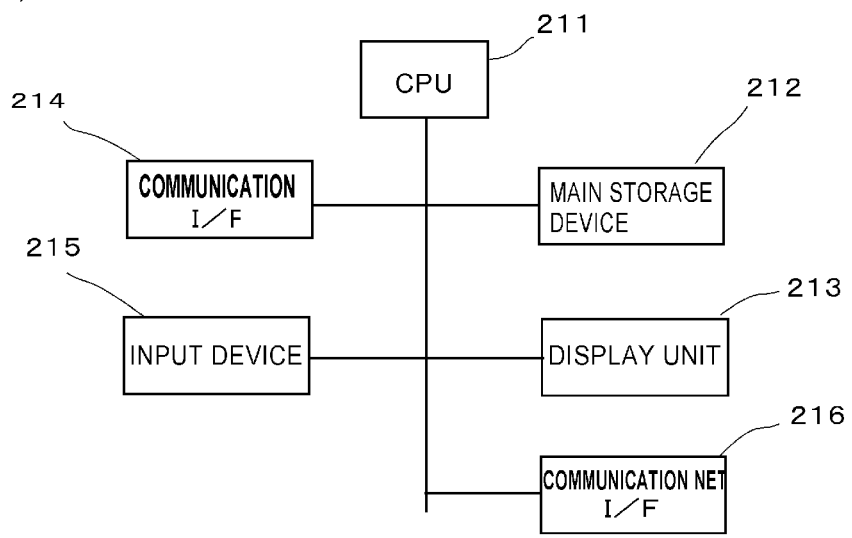
FIG. 6(B) is a diagram illustrating a configuration example of a computer.

FIG. 6(B) illustrates the configuration of a computer that constitutes the inspection marking terminal device 200, and FIG. 1 illustrates an information terminal device of a general tablet type.

The computer has a general configuration, and includes a CPU (Central Processing Unit) 211, a main storage device 212 composed of a ROM and a RAM, a display unit 213 such as for example a touch panel type LCD or the like, a communication I/F 214 for connecting to the transmitter 120, an input device 215 for inputting information, and a communication network I/F 216 for accessing the management server 500 via a relay station and a communication network such as the Internet.

The processes of the abnormality detection unit 201, the marking processing unit 202, the image obtaining unit 203, the position information obtaining unit 204, and the transmission processing unit 205 are performed by executing a program stored in the main storage device 212 or a program stored in the management server 500 via the communication network I/F 216.

Note that the inspection marking terminal device 200 can use a camera controller that is provided separately from the transmitter 120 and includes an operation unit for controlling the operation of the camera 20, or can be provided integrally with the transmitter, and any combination of devices can be used.

FIG. 7 illustrates an example of an inspection procedure of the concrete wall.

Figure 7A:
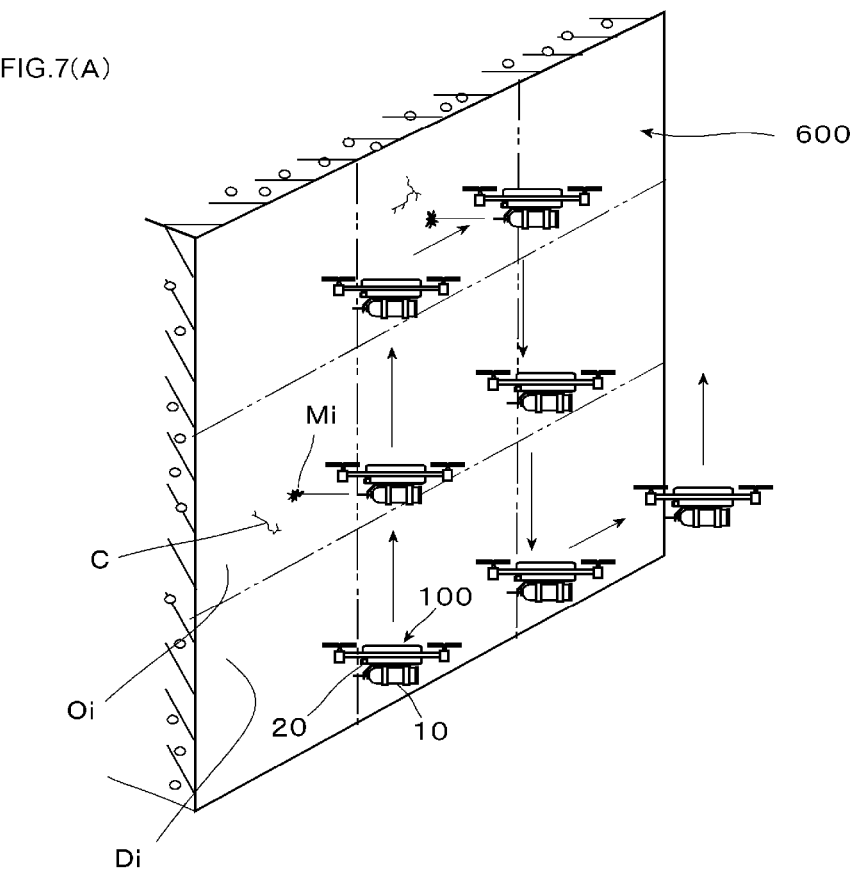
FIG. 7(A) is a view illustrating an example of an inspection process in the case of a vertical wall.

FIG. 7(A) illustrates a vertical wall, in which the concrete wall 600 is divided into a plurality of inspection regions Di in a grid pattern in the vertical and horizontal directions, and inspection is performed by repeating ascent and descent for each column. Marking Processing Process When the inspection is started, the processing of the abnormality detection unit 201 of the inspection marking terminal device 200 is executed. That is, the CPU 211 reads out an inspection processing program from the main storage device 212 to execute a series of inspection processing procedures.

When inspection processing is executed, the flying object 100 flies to a first inspection region Di and enters a hovering state, so that it operates the camera 20 to photograph the inspection region Di thereby to obtain an image for inspection. The image from the camera 20 is received by the transmitter 120 through wireless communication between the flying object 100 and the transmitter 120, and is transmitted from the transmitter 120 to the inspection marking terminal device 200 through the communication I/F 214.

Then, the presence or absence of an abnormal part is detected from the inspection image thus obtained. The abnormal part may be detected, for example, by recognizing the width of a crack and determining that the crack is abnormal when the width is equal to or larger than a predetermined width, or by using a determination means that uses AI.

When there is no abnormal part, the inspection region is moved to the next inspection region.

When there is an abnormal part, the processing of the marking processing unit 202 is executed, so that a liquid material ejection command is transmitted to activate the liquid material ejection device 10 to spray the liquid material on the wall surface of the inspection region Di thereby to form the spray pattern Mi.

When the marking is completed, the processing of the image obtaining unit 203 is executed, and a photographing command signal is transmitted so that the camera 20 is activated to obtain an image of the target region to which the spray pattern Mi is attached. The image thus photographed is transmitted to the inspection marking terminal device 200 via the transmitter 120 in the same manner as the inspection image.

Subsequently, the processing of the transmission processing unit 205 is executed, so that the spray pattern image Pi is extracted from the image of the inspection region Di obtained, and is transmitted to the management server 500 in association with the image and the position information of the inspection region Di to which the spray pattern is attached, and the inspection region is then moved to the next inspection region.

When the liquid material is ejected, a reaction force in a direction opposite to the direction of the ejection of the liquid material acts on the flying object 100 due to the momentum of the ejected liquid material, but since the amount of liquid required to form the spray pattern is small, this does not have any effect.

In the Case of the Concrete Wall 600 being an Inclined Surface

Figure 7B:
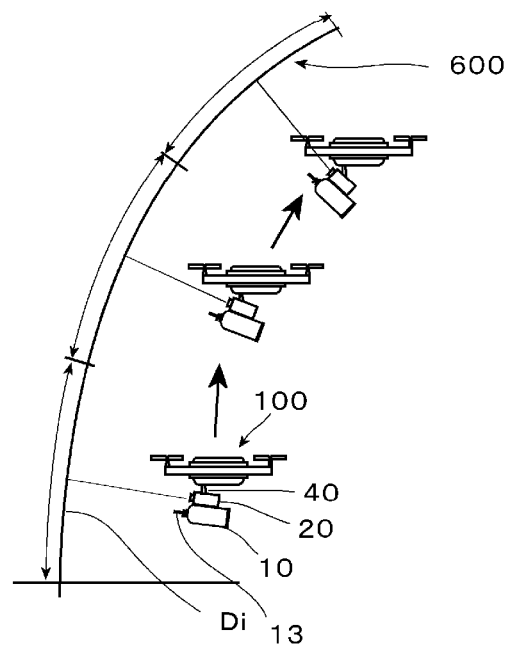
FIG. 7(B) is a view illustrating an example of an inspection process in the case of an inclined wall.

FIG. 7(B) illustrates an example of an inspection procedure in the case of an inclined wall such as a tunnel or the like.

In this case, by using the flying object 100 with the camera 20 and the liquid material ejection device 10 mounted thereon via the gimbal 40, as illustrated in FIG. 4, the camera 20 and the liquid material ejection device 10 can be tilted in accordance with the inclination of the wall surface.

For example, if the flying object 100 is caused to rise while maintaining a certain distance from the wall surface by using a distance sensor, a flight trajectory thereof can be known, and if an optical axis of the camera 20 is aligned perpendicular to the flight trajectory by means of the gimbal 40, the directions of the camera 20 and the nozzle-equipped actuator 13 of the liquid material ejection device 10 can be oriented perpendicular to the wall surface.

Note that in FIG. 7, each inspection region Di is assumed to be photographed or imaged in a state of hovering at a certain position to detect an abnormal part, but it is also possible for the flying object to fly continuously and stop at the time of detecting an abnormal part to perform imaging and marking processing.

Management Server 500

Figure 8:
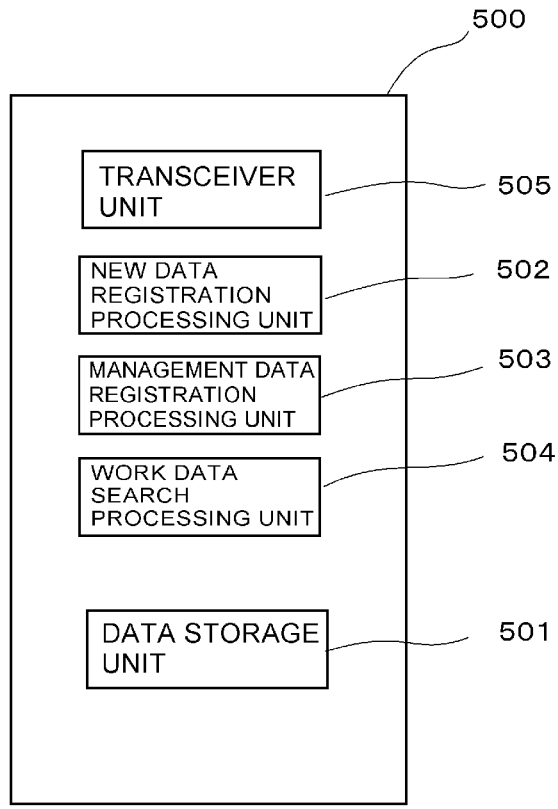
FIG. 8(A) is a functional block diagram of a management server.
FIG. 8(B) is a diagram illustrating a configuration example of a computer.
Figure 8:
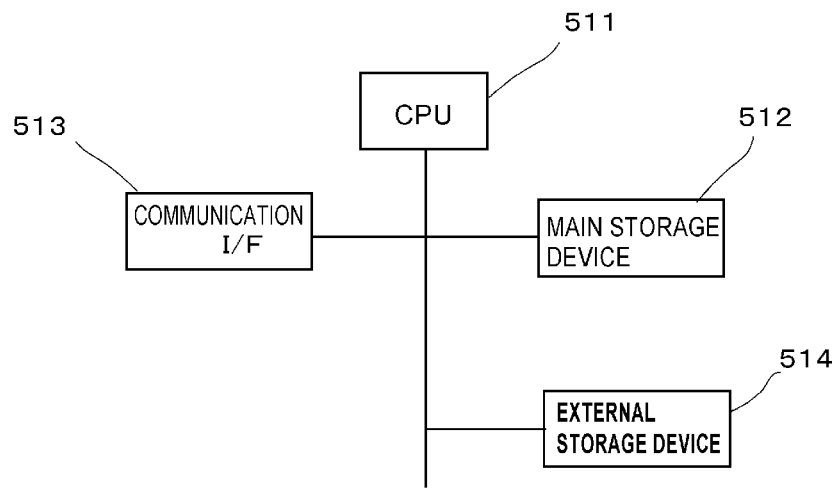

FIG. 8(A) illustrates a functional block diagram of the management server 500.

That is, it includes the data storage unit 501, a new data registration processing unit (registration means) 502, a management data registration processing unit 503, a work data search processing unit 504, and a transceiver unit 505.

The data storage unit 501 stores the spray pattern image Pi, which is image information of the irregular spray pattern Mi formed by spraying the liquid material onto the repair target region, and the repair target region information such as the repair target region image Qi, which is image information of the corresponding repair target region Oi, position information or the like, in association with each other.

The new data registration processing unit 502 registers, in the data storage unit 501, the spray pattern image Pi, the repair target region image Qi, the position information, and the like transmitted from the inspection marking terminal device 200 in association with each other.

In response to a data request transmitted from the manager terminal device 300, the management data registration processing unit 503 obtains the corresponding spray pattern image Pi and repair target region information from the data storage unit 501, and transmits them from the transceiver unit 505 to the manager terminal device 300.

In response to a data request from the worker terminal device 400, the work data search processing unit 504 searches the data storage unit 501 for information of the repair target region corresponding to the spray pattern image Pi, obtains corresponding repair target region information, and transmits it to the worker terminal device 400.

FIG. 8(B) illustrates an example of a hardware configuration of a computer that implements the management server 500.

That is, a CPU 511, a main storage device 512 composed of a ROM and a RAM, a net communication I/F 513, an external storage device 514 such as a hard disk or the like, etc., are provided.

The external storage device 514 is used as the data storage unit 501 illustrated in FIG. 8(A). In addition, each processing unit is operated and processed by the CPU 511 based on a program stored in the main storage device 512, which is a hardware resource, to realize each function. That is, the processes of the new data registration processing unit 502, the management data registration processing unit 503, and the work data search processing unit 504 are performed by executing the program stored in the main storage device 512.

Next, the registration stage of the construction management data will be described.

Figure 9:
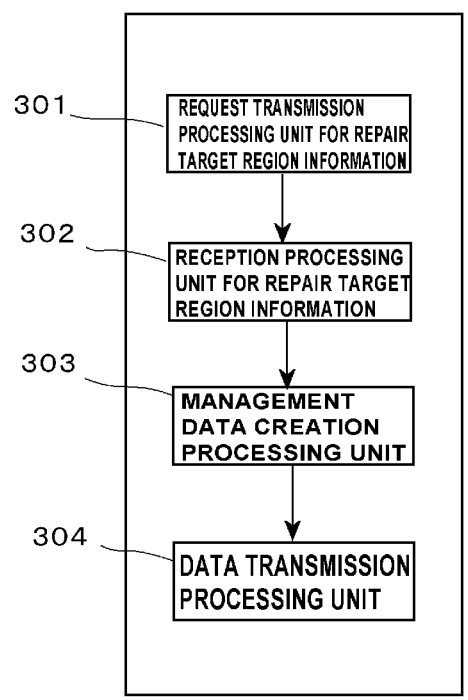
FIG. 9(A) is a functional block diagram of a manager terminal device.
FIG. 9(B) is a diagram illustrating a configuration example of a computer.
Figure 9:
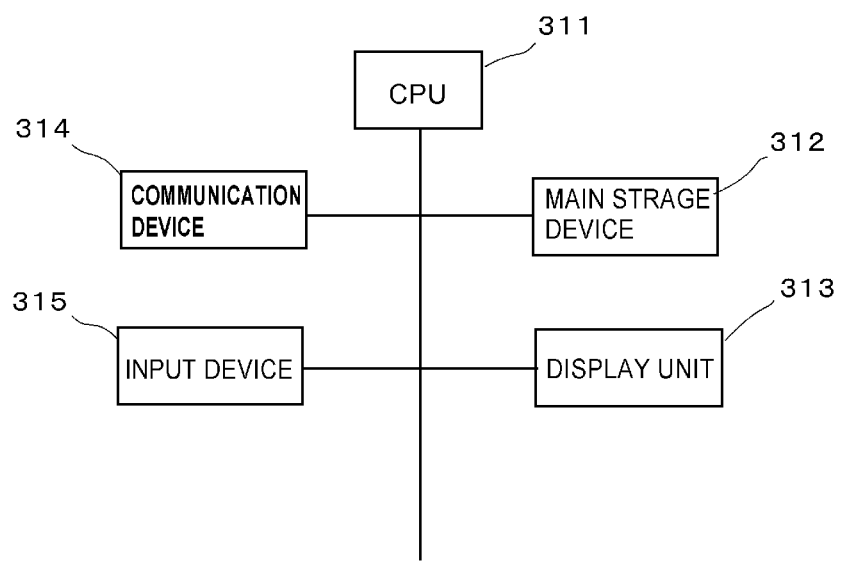

FIG. 9(A) is a functional block diagram of the manager terminal device 300.

That is, the manager terminal device 300 includes a request transmission processing unit 301 that transmits a search request for repair target region information to the management server 500, a reception processing unit 302 that receives the repair target region information from the management server 500, a management data creation processing unit 303 that creates management data such as a construction content or the like, and a data transmission processing unit 304 that transmits the created data.

This manager terminal device 300 constitutes an information updating means for updating data by adding and correcting target object information stored in the data storage unit 501.

FIG. 9(B) illustrates a hardware configuration of a computer that realizes the manager terminal device 300.

That is, a CPU 311, a main storage device 312 composed of a ROM and a RAM, a display unit 313 such as an LCD or the like, a net communication I/F 314 for accessing the management server 500, an input device 315 for inputting information, and the like are provided.

Each processing unit illustrated in FIG. 9(A) is operated and processed by the CPU 311 based on a program stored in the main storage device 312, which is a hardware resource, to realize each function. That is, the processes of the request transmission processing unit 301, the reception processing unit 302, the management data creation processing unit 303, and the data transmission processing unit 304 are performed by executing the program stored in the main storage device 312.

Figure 11:
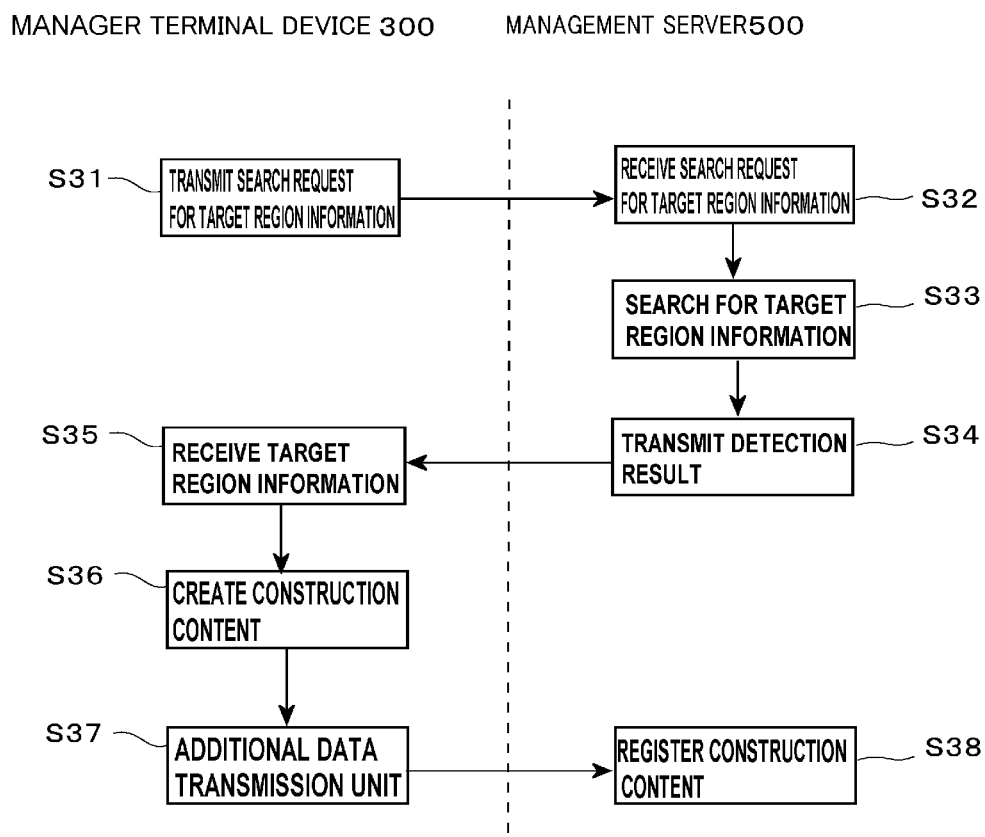
FIG. 11 is a flowchart illustrating an example of a flow of information between the manager terminal device and a management server in FIG. 9.

FIG. 11 illustrates a processing procedure between the manager terminal device 300 and the management server 500.

That is, the manager accesses the management server 500 from the manager terminal device 300, and transmits a search request for target region information for which a construction content is to be registered (S31). The search request can identify the repair target region by identifying, for example, an inspection place or location such as a tunnel, a dam, a bridge or the like, or an inspection date or the like.

In the management server 500, upon receiving the search request at the transceiver unit 505 (S32), the processing of the management data registration processing unit 503 is executed to search the data storage unit 501 for repair target region information (S33), and the repair target region information thus searched or extracted is transmitted to the manager terminal device 300 (S34). At the side of the manager terminal device 300, upon receiving the repair target region information (S35), the repair target region information is displayed on the display unit 313. The manager checks an abnormal part such as a crack or the like from a repair target region image displayed, and inputs an appropriate construction content as additional information to create additional data (S36). When the additional data is created, the additional data is transmitted to the management server 500 (S37), and is registered in the information storage unit 501 in the management server 500 (S38).

Stage of Repair Work

The worker carries the worker terminal device 400 provided with a camera 416, and transmits to the management server 500 the spray pattern image Pi obtained by photographing and imaging the spray pattern Mi attached to the concrete wall 600 at the work site by the camera 416, and requests corresponding target region information. Then, the target region information transmitted from the management server 500 in response to the request is received and displayed on a display unit 413.

Figure 10A:
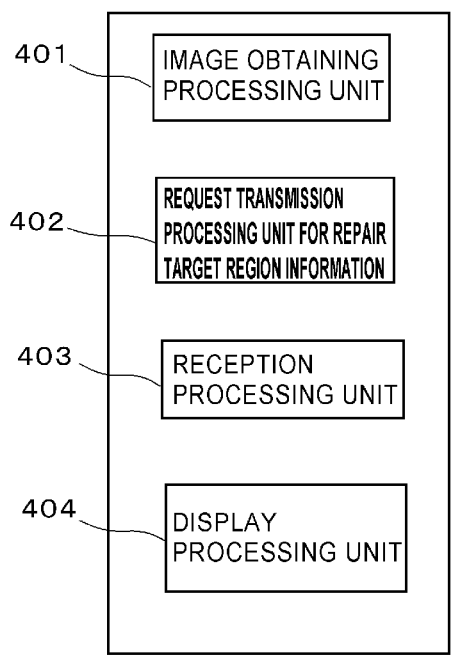
FIG. 10(A) is a functional block diagram of a worker terminal device.

FIG. 10(A) is a functional block diagram of the worker terminal device 400.

That is, the worker terminal device 400 includes an image obtaining processing unit 401 that obtains a spray pattern image, a request transmission processing unit 402 that transmits a search request for corresponding repair target region information with the spray pattern image attached thereto to the management server 500, a reception processing unit 403 that receives the repair target region information from the management server 500, and a display processing unit 404 that displays the repair target region information on the display unit 413.

This worker terminal device 400 constitutes an information obtaining means that obtains corresponding target object information from the data storage unit of the information management system of the present invention.

Figure 10B:
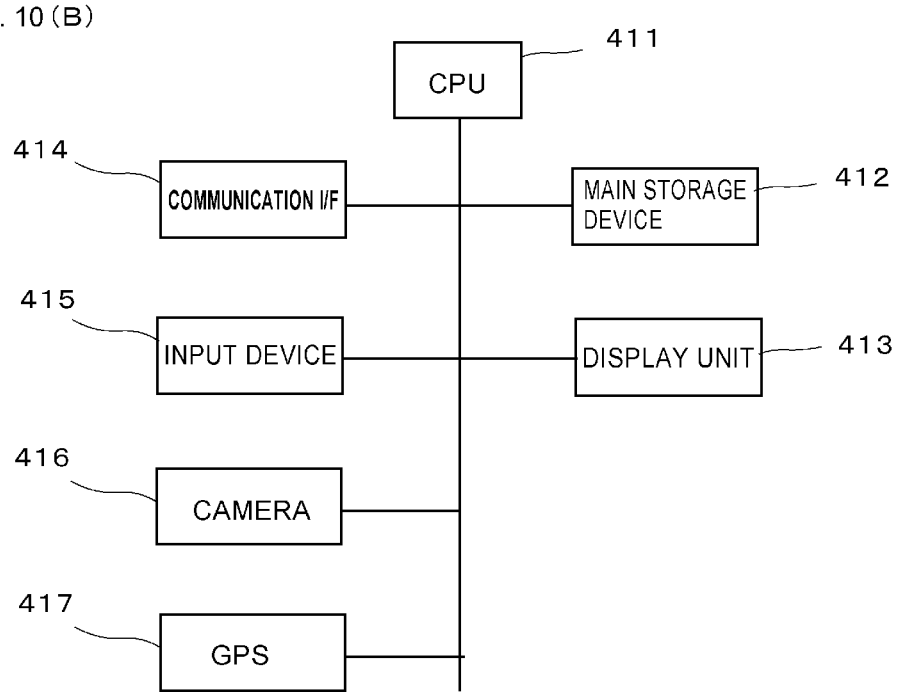
FIG. 10(B) is a diagram illustrating a configuration example of a computer.

FIG. 10(B) illustrates a hardware configuration of a computer that realizes the worker terminal device 400.

That is, a CPU 411, a main storage device 412 composed of a ROM and a RAM, the display unit 413 such as an LCD or the like, a net communication I/F 414 for accessing the management server 500, an input device 415 for inputting information, the camera 416, and a GPS 417 are provided.

The processes of the image obtaining processing unit 401, the request transmission processing unit 402, the reception processing unit 403, and the display processing unit 404, which are illustrated in FIG. 10(A), are performed by executing a program stored in the main storage device 212.

Figure 12:
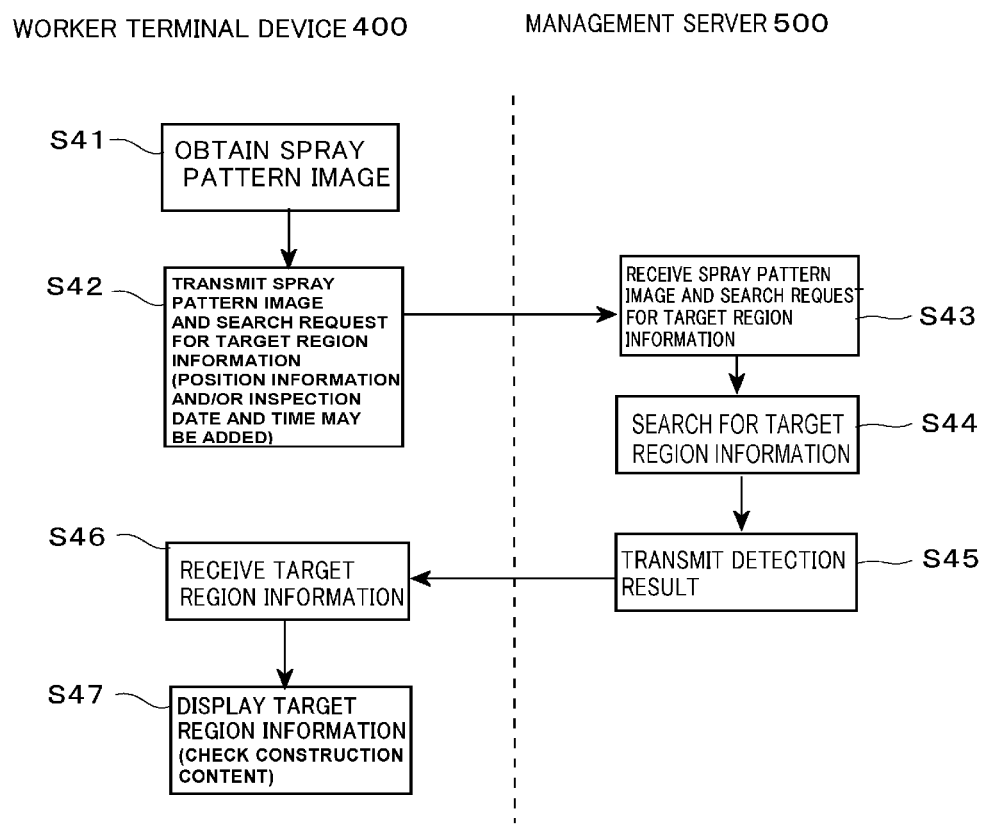
FIG. 12 is a flowchart illustrating an example of a flow of information between the worker terminal device and a management server in FIG. 10.

FIG. 12 illustrates a flow of information between the worker terminal device 400 and the management server 500.

That is, when finding the spray pattern Mi at the work site, the worker photographs the spray pattern with the camera 416 to obtain a spray pattern image (S41), accesses the management server 500, and transmits a search request for repair target region information with the photographed spray pattern image attached thereto. In addition, position information obtained by the GPS 417, inspection date and time, and the like may be added to the search request (S42).

In the management server 500, upon receiving the search request at the transceiver unit 505 (S43), a program for the work data search processing unit 504 is executed to search the data storage unit 501 for repair target region information (S44), and the repair target region information thus searched or extracted is transmitted to the worker terminal device 400 (S45). At the side of the worker terminal device 400, when the target region information is received (S46), repair target region information including a construction content is displayed on the display unit 413 (S47). The worker can check or confirm the site by looking at the spray pattern image and the repair target region image displayed on the display unit 413 as well as the spray pattern and the abnormal part of the wall surface at the site, and perform the repair work according to the construction content displayed.

In this way, the worker can obtain information including the construction content from the management server 500 by photographing the spray pattern Mi with the camera 416 and inquiring to the management server 500, which simplifies the confirmation work and eliminates the need for complicated work of carrying documents describing the construction content.

Other Embodiments

Here, note that in the above-described embodiment, the abnormality detection means is provided as the target region detection unit, but the abnormality detection means is not necessarily required. For example, an inspector may visually monitor images taken from the flying object, and execute marking processing if a defective part is found.

Also, without detecting a specific target region, all target regions may be marked and used as identification information of the target regions.

In addition, in the above-described embodiment, the aerosol container is mounted on the airframe in an exposed state, but it may be mounted on the flying object in a state of being housed in a sleeve which is a housing container. Moreover, in the above-described embodiment, an example has been described in which the aerosol container 11 is mounted outside the airframe 101, but the aerosol container 11 may be configured such that it is placed inside the airframe 101, with the nozzle 17 being connected thereto via the extension tube 16, as illustrated in FIG. 4(C).

Further, in the above-described embodiment, an example has also been described in which a multicopter is used as the flying object on which the liquid material ejection device is mounted, but an unmanned aerial vehicle using propellers may be used, instead of the flying object using rotor blades (rotors). Furthermore, the present invention is not limited to unmanned flying objects, but can also be applied to unmanned or manned moving objects that travel on a road surface.

Also, in the above-described embodiment, a concrete wall has been described as an example of a target of the present invention, but the invention is not limited to such a concrete wall, and can be widely used as identification information of various target objects such as glass of buildings, panels of solar power generation facilities, trees, etc.

DESCRIPTION OF REFERENCE SIGNS 10 liquid material ejection device (liquid material ejection means),
11 aerosol container,
  12 stem, 13 actuator with nozzle, 14 flange,
  16 extension tube, 17 nozzle,
  30 opening and closing mechanism, 31 pressing member, 31a engaging portion, 32 driving unit,
20 camera,
40 gimbal,
50 mounting device, 51 holding member,
100 flying object,
  101 airframe, 102 body portion, 103 arm portions,
  104 rotor blades, 105 motors,
110 control unit,
  110A flight control unit, 110B camera control unit,
  110C gimbal control unit,
  110D ejection control unit (spray control means),
  110E transceiver unit, 112 sensors, 113 GPS,
  120 transmitter, 120A control unit, 120B transceiver unit,
  120C operation unit, 120D communication interface,
200 inspection marking terminal device,
  201 abnormality detection unit (abnormality detection means), 202 marking processing unit, 203 image obtaining unit, 204 position information obtaining unit (position information detection means), 205 transmission processing unit,
  211 CPU, 212 main storage device, 213 display unit,
  214 communication I/F, 215 input device, 216 communication network I/F,
300 manager terminal device,
  301 request transmission processing unit, 302 reception processing unit, 303 management data creation processing unit, 304 data transmission processing unit, 311 CPU, 312 main storage device, 313 display unit,
314 net communication I/F, 315 input device,
400 worker terminal device,
  401 image obtaining processing unit, 402 request transmission processing unit, 403 reception processing unit, 404 display processing unit,
411 CPU, 412 main storage device, 413 display unit, 414 net communication I/F, 415 input device, 416 camera, 417 GPS
500 management server,
  501 data storage unit (information storage means), 502 new data registration processing unit (registration means), 503 management data registration processing unit, 504 work data search processing unit, 505 transceiver unit,
511 CPU, 512 main storage device, 513 net communication I/F,
514 external storage device,
600 concrete wall (target object),
I first stage, II second stage, Ill third stage,
Mi spray pattern, m outer periphery,
Oi repair target region (target object),
Pi spray pattern image,
Qi repair target region image,
Ri repair target region information,
Si position information,
Ti construction content,
N communication network
Di inspection region

The invention claimed is:

1. An information management method comprising:
spraying a visible liquid material on a part of a target object with an abnormal part to form a spray pattern comprising an irregularly-shaped outer periphery, wherein the spray pattern with an irregular shape of an outer periphery is formed by the visible liquid material being ejected and collided with the target object and scattered, or splashing after being ejected and before reaching the target object;
storing a spray pattern image, which is obtained by photographing and imaging the spray pattern, and information about the target object in association with each other; and
managing the information about the target object by using the irregular shape of the irregularly-shaped outer periphery of the spray pattern image as identification information of the target object.

2. The information management method according to claim 1, wherein managing the information comprises:
in response to a data request transmitted from a manager terminal device, transmitting the spray pattern image and the information about the target object associated with each other to the manager terminal device, and
in response to a data request from a worker terminal device to obtain the information about the target object that is associated with the spray pattern image, transmitting the information about the target object to the worker terminal device.

* * * * *